April 14, 1959 R. L. BOYD, JR., ET AL 2,882,383
SPACE HEATING SYSTEM AND APPARATUS
Filed Dec. 9, 1957 3 Sheets-Sheet 1
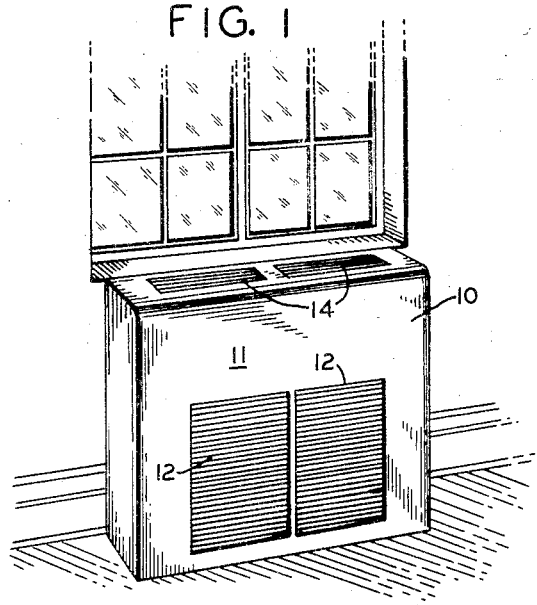
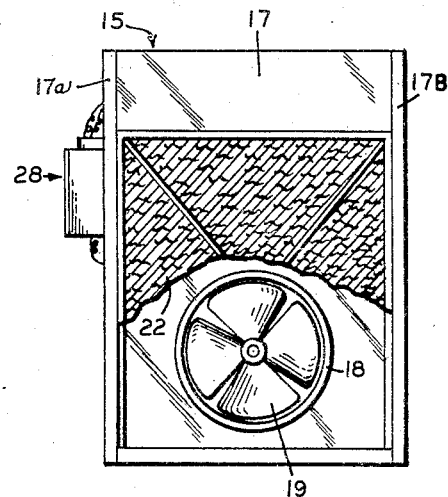
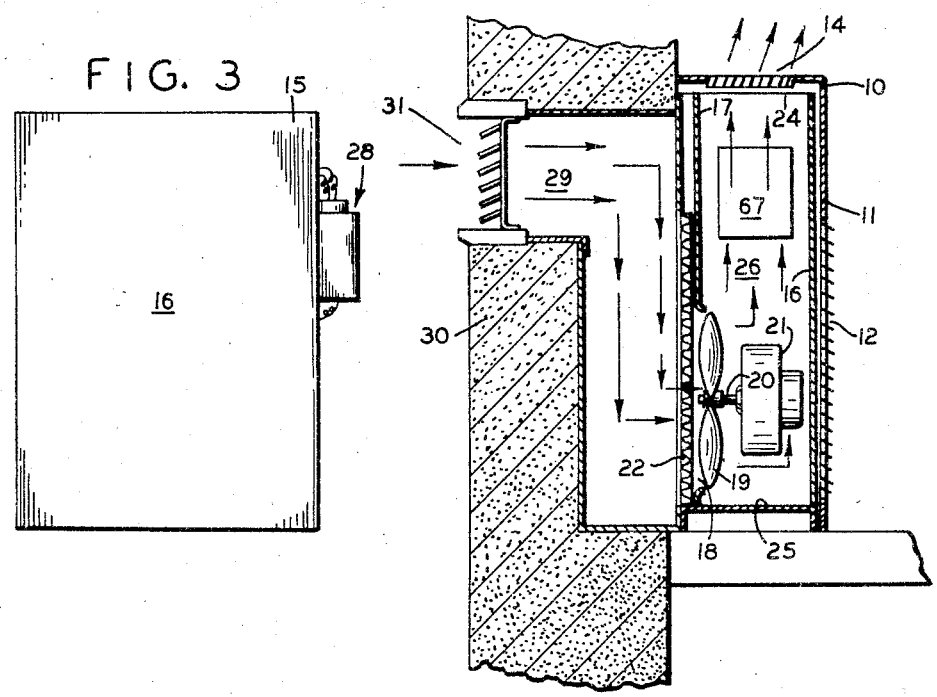
INVENTOR.
ROBERT L. BOYD JR.
CHARLES E. HUNTSINGER
BY
*Blair & Spencer*
ATTORNEYS.

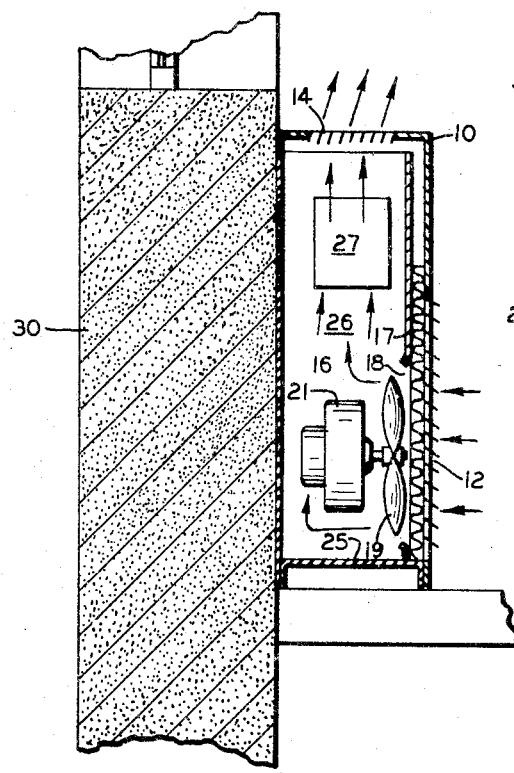
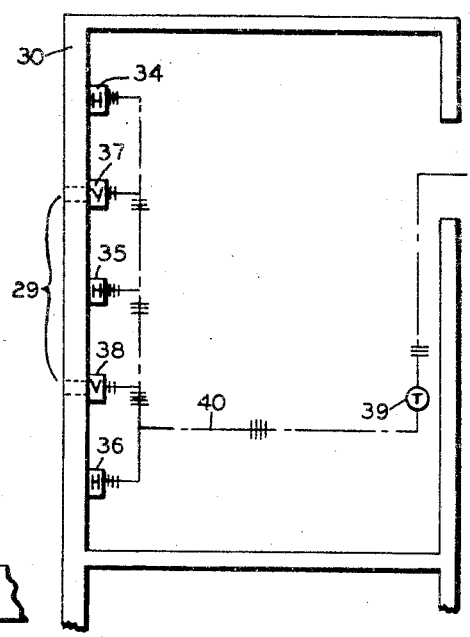
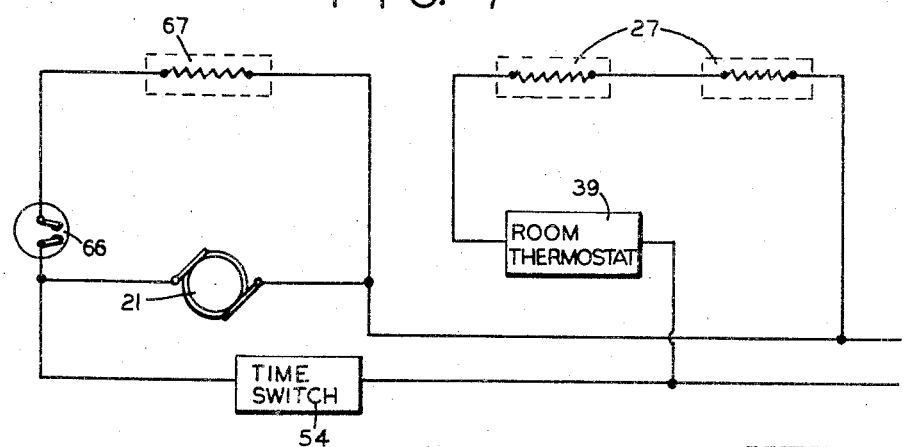

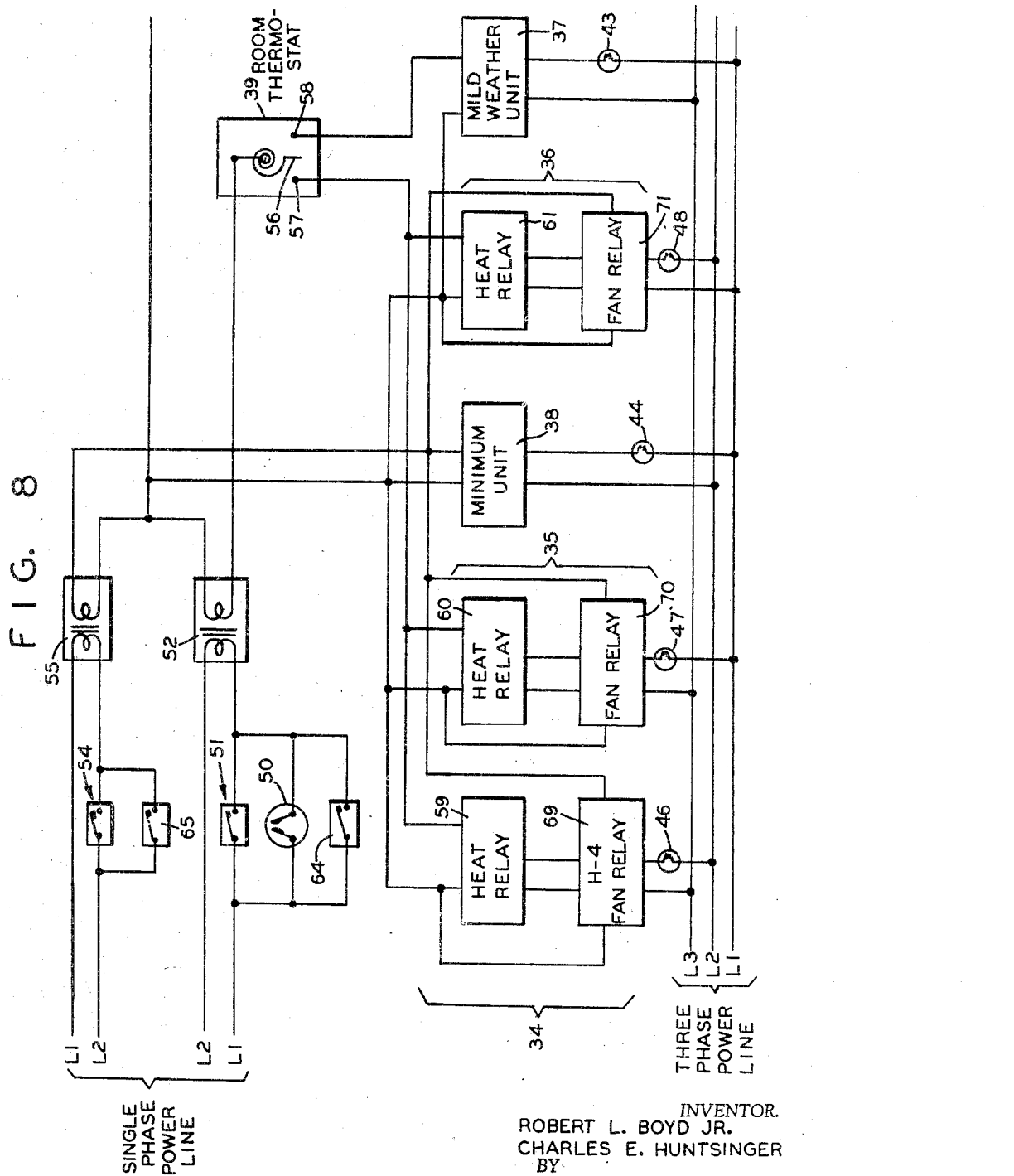

United States Patent Office 2,882,383
Patented Apr. 14, 1959

2,882,383

SPACE HEATING SYSTEM AND APPARATUS

Robert L. Boyd, Jr., and Charles E. Huntsinger, Rochester, N.Y., assignors to Commercial Controls Corporation, Rochester, N.Y.

Application December 9, 1957, Serial No. 701,533

11 Claims. (Cl. 219—39)

This invention relates to a system and apparatus for heating and ventilating enclosed spaces, and more particularly to electrical heating and ventilating means of the forced air type adapted for installation adjacent the outside wall of a room enclosure, and to automatic control means for regulating the operation of the heating and ventilating means according to a predetermined time and temperature program.

This application is a continuation-in-part of our copending application Serial No. 560,443, filed January 20, 1956, now Patent No. 2,820,880, issued January 21, 1958, and assigned to the same assignee as the present application. The present invention may be considered an extension of and an improvement over the aforesaid space heater disclosure inasmuch as a more simplified apparatus is employed which is more economical to manufacture, install, and operate. More particularly, the system of the invention employs a plurality of substantially identical operating units whose different functions are combined and controlled in a predetermined operating cycle by automatic control means which are common to all units of the installation. A particular feature of the present invention is the employment of a unitary structural design of apparatus which may be installed in either of two predetermined positions whereby a number of such units may be combined in a complete system wherein some units serve to recirculate and heat room air while other units of the system serve to ventilate the room by introducing fresh air from the outside, and the fresh air may be tempered if necessary before circulation through the room. By this mode of operation it is possible to circulate any desired quantity of tempered fresh air, which is particularly necessary in rooms occupied by a proportionately large number of persons per unit of cubeage, and at the same time the air temperature in the room may be automatically maintained at any desired level above the temperature of the outside atmosphere. We have discovered that it is possible to attain the desired results of ventilation, heating, or cooling (when the outside temperature is below the level desired within the room enclosure) without resort to the relatively more complex and more costly apparatus disclosed in the prior art.

It is an object of this invention to provide a heater and/or ventilator of the electrical blower type capable of supplying either heated recirculated air or tempered fresh air sufficient to maintain a comfortable and healthful atmospheric condition in a room enclosure. It is another object of the invention to provide a heating and ventilating system employing apparatus of the above character wherein a plurality of apparatus units are employed, some units being adapted to heat and recirculate room air while other units are oriented so as to introduce and temper fresh air from outside the room enclosure, and wherein the units performing these two distinct functions consist of substantially identical structural parts but are oriented differently to perform their different functions. A further object of this invention is to provide automatic control means for maintaining a predetermined atmospheric condition within the room enclosure. An additional object of the invention is to provide a heating and ventilating system including automatic time cycle and zone temperature control in addition to individual unit control. A still further object of the invention is to provide a heating and ventilating system achieving all of the above mentioned objects by means which are more simplified, have a lower initial cost, are easier to install, and more economical to operate, than are the means heretofore known in the art. Other objects of the invention will be in part obvious and will in part appear hereinafter.

The invention accordingly comprises features of construction, combinations of elements and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

Fig. 1 is a perspective view of the apparatus of the invention as installed beneath the window of a room to be heated;

Fig. 2 is a front elevation, partially fragmentary, of the heating and circulating apparatus of the invention with the cover removed;

Fig. 3 is a rear elevation of the apparatus of Fig. 2;

Fig. 4 is a vertical cross section taken through a building wall and through the apparatus of the invention as installed adjacent thereto in one position, with the air inlet opening of the apparatus aligned with a fresh air duct through the wall, showing the installation of the apparatus of Fig. 2 for the purpose of room ventilating by the intake of fresh air from outside;

Fig. 5 is another vertical cross section view, similar to that of Fig. 4 but with the apparatus of the invention reversed and installed against a solid wall in such a position that its air inlet opening is oriented to draw in air from the room enclosure rather than from outside;

Fig. 6 is a room floor plan showing a typical layout in which five units of apparatus according to the invention are installed, two being oriented for ventilation by the introduction of outside air into the enclosure, while the other three units are oriented for heating and recirculation of room air;

Fig. 7 is a schematic wiring diagram for one embodiment of a control system to regulate automatically the operation of heating and ventilating apparatus according to the invention; and Fig. 8 is a schematic wiring diagram for another preferred embodiment of an automatic control system particularly adapted to regulate the operation of five apparatus units according to the invention, when installed in a room as shown in Fig. 6.

Similar reference characters refer to similar parts throughout the several views of the drawings.

The general construction of the heating and circulating apparatus of the invention may be understood from a consideration of Figures 1, 2, 3 and 4. As seen in Fig. 1 and Fig. 4, an external cover generally indicated at 10 comprises four sides of generally rectangular configuration, the cover being designed to stand on the floor and fit snugly against a wall to substantially enclose the apparatus illustrated in Fig. 2 and Fig. 3. The front face 11 of the cover 10 includes in the lower portion thereof one or more screened or louvered openings 12—12 as may be seen in Fig. 1 and Fig. 4. The top of the cover 10 includes one or more openings 14—14 which are preferably louvered to direct the flow of air generally upward and outward therefrom. Enclosed within the cover 10 is a unit of heating and ventilating apparatus which in the preferred embodiment comprises a substantially rectangular casing 15, one side of which (referred to hereinafter as the back side) comprises a solid rectangular plate 16 as seen in Fig. 3, while the opposite, or front, side contains in its lower portion an opening 18 in which is mounted an air circulating fan 19. The fan 19 is mounted on the rotatable shaft 20 of an electric motor 21 mounted in casing 15 by suitable bracketing (not shown). It is to be understood, however, that other forms of air circulating means may be employed, as for example an air circulating turbine impeller may be employed in lieu of the simple fan disclosed in the preferred embodiment of Fig. 2, Fig. 4 and Fig. 5. Over the air inlet opening 18 in the front side 17 of casing 15 an air filtering means 22 is mounted in suitable flanged channels 17a and 17b. The filter 22 may be any suitable form of air filter adapted to remove dust particles from air passing therethrough. In the top of the apparatus casing 15 is an air outlet opening 24 which in the preferred embodiment is provided by the omission of any top whatever therefor. As may be seen clearly in Fig. 4 and Fig. 5 of the drawings the bottom of the apparatus case 15 is completely enclosed by a bottom plate 25. Thus it will be apparent from a consideration of Fig. 4 that between the air inlet opening 18 and the air outlet opening 24 the apparatus casing 15 forms a substantially enclosed plenum chamber through which air may be forced in the direction indicated by the arrows when the fan 19 is rotated by its motor 21. Within this plenum chamber 26 is mounted a heating element 67 which in the preferred embodiment comprises an electrical heating element of the type disclosed in our co-pending application referred to hereinabove. This heating element may be supported from brackets (not shown) connected to the sides of the casing 15. Mounted on the frame of the casing 15 are relay control means indicated generally at 28 in Fig. 2 and Fig. 3 for controlling the operation of heating element 27 and fan motor 21 as will be described more fully hereinafter with reference to the circuit figures in the drawings of Fig. 7 and Fig. 8. In the preferred embodiment of the invention the relay means 28 are mounted externally of the plenum chamber formed by the casing 15, as shown in Fig. 2 and Fig. 3, to avoid interference with or obstruction to the passage of air therethrough, but it will be understood that these relay elements may be mounted within the enclosure of casing 15 without departing from the invention.

As shown in Fig. 4 the apparatus of the invention is installed with its air inlet opening 18 substantially aligned with an air duct 29 through an exterior building wall 30 on the exterior of which a louvered opening 31 connects with the outside atmosphere. When installed in this manner, the louvered opening 12 of the cover 10 abuts against the solid back panel 16 of the apparatus casing 15 so that the opening 12 serves no functional purpose, all of the air leaving the outlet opening 14 being drawn in through the fresh air duct 29.

Referring now to Fig. 5 of the drawings, the apparatus of Fig. 2 and Fig. 3 may be seen installed within the cover 10 against a solid building wall 30, in this instance with the solid back panel 16 of the casing 15 substantially flush with face of solid wall 30; here the air inlet opening 18 in the front panel 17 is aligned with the louvered opening 12 in the front face of the cover 10, in a position to draw in air from the room and recirculate room air after its forced passage over heating element 27. Heating element 27 of Fig. 5 may be structurally identical with element 67 of Fig. 4 (opposite ends thereof being shown in the separate figures), and the different reference characters are here employed primarily to facilitate understanding of the separate functions of these corresponding elements when a pair of structural units are combined in a heating-ventilating system as described hereinafter in reference to Fig. 7 of the drawings. Thus it will be apparent that the installation of Fig. 5 does not serve to ventilate the room by the introduction of fresh air but only serves to recirculate and heat room air by its passage through the heating and circulating apparatus.

Reference is now made to Fig. 6 of the drawings which represents the floor plan of a typical installation employing a plurality of apparatus units according to the invention as they may be installed for the purpose of heating, ventilating, and cooling a room enclosure in which a substantial number of persons may be congregated for limited times during a normal day, as for example in a classroom. In Fig. 6 members 34, 35, and 36 represent units of apparatus installed against a solid exterior wall 30 in the manner disclosed in detail by Figure 5, while units 37 and 38 are installed adjacent to and in alignment with air ducts 29—29 in the manner disclosed in detail by Fig. 4 for the purpose of ventilating the room by the introduction of fresh air from outside the room enclosure. As will be described more fully hereinafter in reference to Fig. 8 of the drawing, unit 37 in Fig. 6 may be designated a "mild weather" ventilator which serves to cool the room interior when the temperature of room air rises above a preset desirable maximum as may occur from the combined effects of internal heat from lights, appliances, sun radiation upon the building, and the combined body heat of people within the enclosure. As regards the control methods, this unit may be replaced by a self-contained air conditioning apparatus built into the wall in accordance with present practice. Unit 38 may be designated the "minimum fresh air" ventilator which may be adapted to operate continuously during periods when the room enclosure is occupied by the prescribed number of persons, and which will provide the minimum amount of fresh air required by the occupants, as may be prescribed by local building codes and/or health authorities. The apparatus units 34 through 38 of Fig. 6 are interconnected with a room thermostat 39 by electrical cabling shown generally at 40. The room thermostat 39 is preferably mounted on the far wall of the room, located remotely from the air outlet openings of the heating and ventilating units 34–38.

For a more detailed description of the manner in which the heating and ventilating system of Fig. 6 may be operated and controlled according to the invention, reference is now had to Fig. 8 of the drawings which discloses a wiring diagram for the room installation of Fig. 6. It is to be understood that the system of the invention is particularly adapted to controlling heating, ventilating, or cooling under a variety of normal operating conditions as may be encountered at different times depending upon the use and occupancy of the room enclosure. Thus, for example, in a schoolroom installation as may be represented by the plan of Fig. 6, no ventilation and substantially less heating will normally be required during the night time when the room is unoccupied and unused, but nevertheless during the cold weather season a certain amount of heat must be supplied even during the unoccupied periods in order to protect plumbing and other apparatus from freezing, to prevent total loss of the heat stored within the enclosure during the period of occupancy, and to decrease the heating load when the apparatus is required to bring the room up to the temperature required during occupancy. As the night time temperature during the cold weather season will normally be lower than the minimum temperature required for occupancy, a certain warm-up period must be provided prior to the time of expected occupancy. Also, during periods of occupancy, the system automatically provides: the minimum fresh air ventilation required; automatic tempering or warming of the fresh air as may be required depending upon the temperature of the outside atmosphere; heating of the room air to any temperature prescribed for comfort or health; or cooling of the room air as may be called for, provided the temperature of the outside atmosphere is below that required within the room enclosure. The manner in which all of these operations are automatically performed will now be described in reference to Fig. 8 of the drawings wherein a zone thermostat 50 is provided to maintain a minimum temperature during the night time or unoccupied period of cyclic operation and a clock operated switch 51 is adapted to open and close an operating circuit through a temperature control transformer 52 at preset times according to any predetermined operating program. A second clock operated switch 54 is adapted to open or close the operating circuit of ventilation control transformer 55 according to any preset ventilating program. Switches 51 and 54 may normally be operated by a common clock mechanism but at different times depending upon their individual settings, or separate clocks may be provided for each switch if desired.

A temperature responsive element 56 at room thermostat 39 is adapted to contact terminal 57 whenever room temperature drops below a predetermined minimum and heating is called for, and alternatively element 56 will contact terminal 58 whenever the room temperature rises above a predetermined maximum and cooling is called for. Thus it will be seen that when the room thermostat 39 calls for cooling (contact 58) the fan motor of the mild weather ventilating unit 37 is activated, while the heat relays 59, 60, and 61 of heating units 34, 35, and 36, respectively, are deactivated. Conversely, when the room thermostat 39 calls for heating (contact 57) the fan motor of the mild weather ventilating unit 37 is deactivated while the heating relays 59, 60, and 61 of heating units 34, 35, and 36 are all operated to provide additional heating. Meanwhile minimum ventilation unit 38 continues to operate under the exclusive control of clock switch 54 and transformer 55. Ventilating units 37 and 38 have thermostatic switches 43 and 44 connected in series with the heating elements therein and responsive to the temperature of air preferably after passing the heating elements; these switches control the heating elements to temper the ventilation air whenere it falls below a predetermined minimum temperature, as for example 55°. The fan relays 69, 70, and 71 of the heating units are under the control of individual thermostatic switches 46, 47, and 48 in a manner to be hereinafter described. The sequence of control for various conditions of operation of the system, diagrammatically represented in Figs. 6 and 8, will now be recounted. First assume an operation with the room unoccupied (essentially evening and night); the space will soon fall below that called for by room thermostat 39 and thus element 56 engages contact 57. Space temperature in the vicinity of the zone thermostat 50 is above the present minimum, say approximately 50°, and none of the heating or ventilating units of the system operate. When space temperature falls below the setting of the zone thermostat 50, the temperature control transformer 52 is energized to activate the heating relays 59, 60, and 61 of all heating units. This in itself may be sufficient to bring the space back to minimum temperature when switch 50 opens. However, when the heating elements of heater units 34, 35, and 36 become sufficiently warm and the space is not up to the prescribed minimum temperature, thermostatically operated fan switches 46, 47, and 48 turn on the fan motors of each unit and room air is circulated through and around the heater elements. In any event, when zone thermostat 50 is satisfied by the minimum temperature, control transformer 52 is de-energized, heat relays 59, 60, and 61 are deactivated to turn off power to the heating elements of units 34, 35, and 36, and no further heat is added to the room enclosure. Fan motors of the heating units 34, 35, and 36 continue operation, however, until the temperature of each heating element has fallen below the predetermined value at which thermostatic switches 46, 47, and 48 are set. Throughout this unoccupied or night time period, however, thermostats 43 and 44 automatically control the heating elements in each of the ventilators 37 and 38; thus any outside air infiltrating through either unit without fan motor operation is tempered automatically before admission to the room.

An initial warm-up period is required prior to the scheduled arrival of occupants, the time and duration of which is determined by the setting of clock switch 51. Thus, the clock controlled transformer 52 is energized at the start of this warm-up period and the room, being usually cool, thermostat 39 calls for the desired room temperature during occupancy (normally about 70°). Thus element 56 engages contact 57 to energize the heat relays in each of heater units 34, 35, and 36; when each heating element warms sufficiently, fan switches 46, 47, and 48 turn on the fans. When room thermostat 39 is satisfied, the heat relays and heating elements of units 34, 35, and 36 are de-energized and the fan motors of these units are subsequently turned off by the fan switches 46, 47 and 48.

During the day period of occupancy, the initial warm-up period has already transpired. The clock-controlled ventilation is preset to close switch 54 a short time before the scheduled period of occupancy, i.e. shortly before school opening. Ventilation transformer 55 is thereby energized to turn on the fan motor of minimum ventilation unit 38. This unit 38 supplies a constant quantity of outside fresh air for ventilation through the scheduled period of room occupation. Thermostatic switch 44 energizes the heating element within unit 38 to maintain the fresh air at least to the minimum temperature preset on that unit thermostat (normally this may be set at about 55°). If the outside air is below this preset temperature, switch 44 cycles the heating element of ventilating unit 38 to maintain ventilation air within a few degrees of this desired value. If the temperature of outside air is above this preset minimum, fresh air is introduced through unit 38 without any further heating. In the event that the room temperature rises above the room thermostat setting, element 56 of room thermostat 39 disengages contact 57 and interrupts operation of heat relays 59, 60, and 61. At this time minimum ventilation air (tempered if necessary) is supplied by ventilating unit 38, and heater unit air circulation is maintained by units 34, 35, and 36 without the addition of further heat.

If the room temperature continues to rise to a predetermined higher setting (say 4° above optimum temperature), the element 56 of room thermostat 39 engages cooling contact 58, thereby completing a circuit to actuate the fan relay of the mild weather ventilator 37, which in turn actuates the fan motor of unit 37 to furnish additional ventilation air to overcome the room tendency to overheat. Should this air be too cold, thermostatic switch 43 may close so that the heating element in unit 37 cuts in to temper this incoming air. The manual override switch 64 may be provided for short circuiting, or by-passing, the zone thermostat 50 and the clock switch 51 to provide heat during periods of normal unoccupancy. A similar manual switch 65 may be provided for by-passing the clock-controlled ventilation switch 54 to provide more ventilation manually when needed. Accordingly, greater flexibility of system operation to facilitate accommodation of any occasional departures from the normal preset schedules is provided.

Turning now to Fig. 7, there is shown a preferred line voltage controlling circuit for heating elements 27 and 67, in their respective units, fans 21 and related equipment. Thus fresh air heating element 67 is connected in parallel with motor 21 for fan 19 and a thermostatic switch 66 is in series with heating element 67. A time switch 54 is in the circuit of motor 21 and heating element 67. A room thermostatic switch 39, of standard construction, is in the circuit of and hence controls heating elements 27; this switch is preferably remote from the apparatus and responsive to room temperature.

Manual controls may replace these automatic controls if desired.

It will thus be seen that we have provided a heating and ventilating apparatus and system which is admirably adapted to automatically maintain any desired temperature in a room enclosure and to circulate adequate quantities of fresh air at comfortable and healthful temperatures as may be required for example in school rooms, offices, factories, or other enclosures which may normally be occupied by substantial numbers of persons during limited periods of time, and on a normally regular and repetitive schedule from day to day. Furthermore, it will be appreciated that according to the invention, the separate functions of heating, circulating, ventilating, and cooling are performed in a systematic manner by a combination of a plurality of separate apparatus units of substantially identical construction which may be interconnected with a common automatic control system in a variety of circuit combinations so that operation of any one function does not interfere with the other functions, and operation of any combination according to any desired program plan is practical. Additionally, both the apparatus and the control means of the invention are more simple in construction and more economical of manufacture and operation than are the means of the prior art. Accordingly, we have disclosed means by which all of the several objects hereinabove referred to have been successfully and practically accomplished.

It is to be understood that although we have described the invention as particularly embodied in a heating and ventilating system adapted to schoolrooms, the invention is not limited to such use but affords a practical and economical solution to the problems of heating and ventilating many other spaces, as for example, bars, dining rooms, dance halls, and any other places where substantial numbers of people often congregate for periods of time with resultant need for ventilation to minimize odors from smoking, respiration, and perspiration, and to minimize heat build-up.

Since many changes may be made in the construction which has been described without departing from the scope of the invention, it is intended that all matter contained in the above description or shown in the accompanying drawings shall be interpreted as illustrative and not in a limiting sense.

We claim:

1. A heating and ventilating system comprising, in combination, a plurality of individual units each comprising an air inlet opening, an electrical fan, a heating element, and an air exhaust opening; individual housing covers for each of said units, said covers having air exhaust openings in the top thereof and air intake openings adjacent the bottom portion thereof; a first one of said units installed adjacent an exterior wall having an air duct to the outside atmosphere in substantial alignment with the air inlet opening of said one unit whereby outside atmosphere may be drawn therethrough, a second one of said units installed with its air inlet opening substantially aligned with the air intake openings of its housing cover whereby room air may be drawn therethrough, and automatic control means including a clock and room thermostat regulated temperature control connected with the heating element of said second unit, a zone low limit thermostat for over-riding said clock control at a predetermined minimum temperature, and a further clock regulated ventilation control for activating the fan of said first unit at predetermined time intervals.

2. A heating and ventilating system according to claim 1 in which said automatic control comprises a first relay in said second unit responsive to said room thermostat for controlling the heating element thereof, and a second relay in said unit under control of a second thermostat within said unit to operate the fan thereof only when the air within said unit surrounding said second thermostat attains a predetermined minimum temperature.

3. A heating and ventilating system according to claim 1 characterized by a thermostatic switch in said first unit adapted to activate the heating element thereof whenever the exhaust air therefrom is below a predetermined temperature.

4. A heating and ventilating system according to claim 1 characterized by an external control circuit comprising a first clock operated switch for activating the ventilator fans in a predetermined time sequence, a second clock operated switch in combination with a room thermostat for activating the heater elements in a predetermined time sequence conditional upon heating demand by said room thermostat, and a second thermostat normally set at a predetermined temperature lower than said room thermostat and adapted to over-ride said second clock operated switch to activate the heater elements whenever the air temperature at said second thermostat reaches said predetermined lower value.

5. A room heater-ventilator comprising, in combination, a substantially enclosed structure having oppositely disposed substantially parallel normally vertical front and back side walls, an air inlet opening in one of said vertical side walls adjacent the bottom of said structure, an air exhaust opening in the top of said structure in a plane substantially normal to said vertical side walls, an air intake fan mounted in said air inlet opening, a heating element within said structure disposed between said fan and said air exhaust opening, air filter means removably mounted over said air inlet opening, means for mounting said structure in either of two alternate positions to the vertical wall of a room whereby either the front side wall or back side wall thereof is flush with the plane of the room wall, and an external housing cover adapted to fit over and substantially enclose three sides of said structure in either mounted position, said cover having air inlet openings in one side and air outlet openings in the top thereof.

6. The structure of claim 5 in combination with a first relay for controlling operation of said air intake fan, a second relay for controlling operation of said heating element, and temperature controlled safety means adapted to interrupt operation of said heating element at a predetermined maximum temperature.

7. The structure of claim 5 including a thermostat control responsive to the temperature of exhaust air leaving said heater-ventilator and adapted to activate said heating element whenever the temperature of said air falls below a predetermined minimum and to deactivate said element when the temperature of said air reaches a predetermined normal value.

8. In a room heating and ventilating system including an electrical heating unit and an electrically operated ventilating fan unit, automatic control means comprising a heating relay in said heating unit and a fan relay in said ventilating unit, a thermostatic switch in said ventilating unit adapted to operate a separate heating element in said ventilating unit whenever the temperature of air therethrough falls below a predetermined minimum, a clock operated switch adapted to turn on the fan motor of said ventilating unit at a predetermined time and to turn off said fan at another preset time, means connecting the motor of said ventilating fan through said clock switch to a source of electrical energy, a room thermostat normally located within the room to be heated and ventilated and adapted to call for either heating or cooling whenever the air temperature of the room falls below or rises above predetermined settings; means connecting said room thermostat in its heating condition in series relation with said heating unit relay and a source of electrical energy whereby operation of said heating element is under the control of said room thermostat; and further means connecting said room thermostat in its cooling condition in series relation with said clock operated switch, the fan motor relay of said ventilating unit, and a source of electrical energy whereby said ventilating unit is operated under the combined control of said clock switch and said room thermostat when calling for cooling.

9. In a room heating and ventilating system including a plurality of electrical heating units each having a motor driven circulating fan, and at least two ventilating units having separate motor driven fans, automatic control means comprising a separate heating relay and a separate fan relay in each of said heating units, a separate thermostatic switch in each of said ventilating units adapted to operate individual heating elements in said ventilating units whenever the temperature of air circulated therethrough falls below a predetermined minimum, a first clock operated switch adapted to turn on at least one of said ventilating fans at a predetermined time and to turn off said fan at another preset time, means connecting the motor of said ventilator fan through said first clock switch to a source of electrical energy, a second clock operated switch adapted to condition the heating relays and fan relays of said heating units for operation at a predetermined time and to interrupt operation of said relays at another preset time, a zone thermostat switch connected in parallel with said second clock operated switch and adapted to short circuit said clock switch whenever the air temperature at said zone thermostat falls below a predetermined minimum, a two condition room thermostat normally located within the room to be heated and ventilated and adapted to call for either heating or cooling whenever the air temperature of the room falls below or rises above predetermined settings; means connecting said room thermostat in its heating condition in series relation with said second clock operated switch, said heating unit relays and a source of electrical energy whereby operation of said heating element and fan relays is under the combined control of said room thermostat and said second clock switch or said zone thermostat; and further means connecting said room thermostat in its cooling condition in series relation with said first clock operated switch, the fan motor of said second ventilator, and a source of electrical energy whereby both of said ventilating units operate under the combined control of said first clock switch and said room thermostat when calling for cooling.

10. Room heating and ventilating apparatus comprising in combination a substantially rectangular enclosure having an air inlet opening in one substantially vertical side wall thereof, an air outlet opening in another side thereof perpendicular to said first mentioned side wall, a plenum chamber connecting said two openings, a fan within said chamber for moving air from said inlet opening to said outlet opening, a heater element within said chamber for heating the air as it moves therethrough, an air filter removably mounted over one of said openings, and a substantially rectangular four sided shell adapted to substantially enclose said combined apparatus, one open side of said shell being adapted for flush mounting against a room wall when the apparatus and enclosing shell are installed in a room to be heated and ventilated, inlet openings and outlet openings in said shell in substantial alignment with corresponding openings in said apparatus in one orientation thereof, said apparatus adapted to be contained within said shell in either of two operating orientation positions, in one position of which the shell openings are congruent with the apparatus openings whereby the combined structure is a recirculating-heating unit, and in the other position the apparatus is reversed in orientation such that the shell outlet opening is congruent with the apparatus outlet opening while the apparatus inlet opening is flush with the room wall so that outside air may be admitted from a passage passing through said wall into said apparatus inlet opening and to said plenum chamber while said shell inlet opening is inoperative, whereby in said second orientation position the combined structure is a heating-ventilating unit.

11. A space heating and ventilating system comprising in combination a heating-ventilating unit and a recirculating-heating unit as defined in claim 10, means affording passage of outside air to the inlet opening of said heating-ventilating unit, means selectively connecting the fans and heater elements contained in said units to a power source, and control means such that when the temperature of the space to be heated and ventilated is below a preset minimum said selective connecting means applies power from said source to both said heating-recirculating unit and said heating-ventilating unit, and when the temperature is above a preset maximum said heating-recirculating units are disconnected and only the fan of the heating-ventilating unit is connected for operation.

References Cited in the file of this patent
UNITED STATES PATENTS

| | | |
|---|---|---|
| 2,450,983 | Osterheld | Oct. 12, 1948 |
| 2,458,268 | Hinds | Jan. 4, 1949 |
| 2,459,986 | Worden | Jan. 25, 1949 |
| 2,604,267 | Smith | July 22, 1952 |
| 2,820,880 | Huntsinger et al. | Jan. 21, 1958 |